US006406111B1

United States Patent
Klassen et al.

(10) Patent No.: US 6,406,111 B1
(45) Date of Patent: Jun. 18, 2002

(54) METHOD OF INCREASING THE RESOLUTION OF AN INK JET PRINTER

(75) Inventors: R. Victor Klassen, Webster, NY (US); Patrick O. Gilhuly, Waterloo (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/146,427

(22) Filed: Sep. 3, 1998

(51) Int. Cl.[7] .................. B41J 29/38; B41J 2/205; B41J 2/145; B41J 2/15
(52) U.S. Cl. .................. 347/9; 347/5; 347/15; 347/41
(58) Field of Search .................. 347/5, 9, 14, 15, 347/37, 41, 131, 138, 40

(56) References Cited

U.S. PATENT DOCUMENTS

| 4,437,122 A |   | 3/1984  | Walsh et al. ............. 358/166 |
| 4,739,415 A | * | 4/1988  | Toyono et al. ........... 358/296 |
| 4,774,530 A |   | 9/1988  | Hawkins ................... 347/63 |
| 5,029,108 A |   | 7/1991  | Lung ....................... 364/519 |
| 5,121,343 A | * | 6/1992  | Faris ...................... 358/1.12 |
| 5,270,728 A |   | 12/1993 | Lund et al. ................ 347/5 |
| 5,650,858 A | * | 7/1997  | Lund ....................... 358/298 |
| 5,677,714 A |   | 10/1997 | Klassen et al. ............. 347/9 |
| 5,685,222 A | * | 11/1997 | Yokoyama et al. ....... 101/128.4 |
| 5,717,499 A | * | 2/1998  | Johnson et al. .......... 358/444 |
| 5,742,300 A |   | 4/1998  | Klassen .................... 347/9 |
| 5,959,656 A | * | 9/1999  | Dhong et al. ............. 347/254 |

FOREIGN PATENT DOCUMENTS

EP          0 720 919 A  *  7/1996  ............ B41J/2/505

* cited by examiner

Primary Examiner—John Barlow
Assistant Examiner—Alfred E. Dudding
(74) Attorney, Agent, or Firm—Oliff & Berridge, PLC

(57) ABSTRACT

A method is provided for printing a pixel image using an ink jet printer having a first resolution along a first axis and a second resolution along a second axis. A resolution of the pixel image is increased along the first and second axis. The pixel image having the increased resolution is thinned using priority masks and subsequently raster scanned with the ink jet printer to visibly reproduce the pixel image at the increased resolution.

21 Claims, 6 Drawing Sheets

PATTERN A
PATTERN B
PATTERN C

MASK A
MASK B

METHOD OF INCREASING THE RESOLUTION OF AN INK JET PRINTER

BACKGROUND OF THE INVENTION

1. Field of Invention

This invention relates to ink jet printers and more particularly, to a method of achieving efficiency by utilizing two-dimensional resolution enhancement and thinning of a pixel image using priority masks.

2. Description of Related Art

An ink jet printhead selectively ejects droplets of ink from a plurality of drop ejectors to create a desired image on an image receiving medium such as paper. The printhead typically comprises an array of drop ejectors that convey ink to the image receiving medium. In a carriage-type, ink jet printhead, the printhead moves back and forth relative to the image receiving medium to print the images in swaths.

The ink jet printhead typically comprises a plurality of ink passageways such as capillary channels. Each channel has a nozzle end and is connected to an ink supply manifold. Ink from the manifold is retained within each channel until in response to an appropriate signal applied to a resistive element in that channel, the ink in a portion of the channel adjacent to the heating element is rapidly heated and vaporized. Rapid vaporization of some of the ink from the channel creates a bubble that causes a quantity of ink (i.e., an ink droplet) to be ejected through the nozzle to the image receiving medium. U.S. Pat. No. 4,774,530 to Hawkins, the disclosure of which is incorporated herein by reference, shows a general configuration of a typical ink jet printer.

Many commercially available ink jet printers have a 300 dots per inch (dpi) resolution along the horizontal axis (also called the raster scan axis) and a 300 dpi resolution along the vertical axis so as to form round individual ink droplets that form the pixel images on the paper. These ink jet printers are therefore designed to print 300×300 dpi output images. However, increased resolution is desired to print higher resolution images and thus visually pleasing images. For example, it may be desirable to print a pixel image at a 300×600 dpi effective resolution using a 300 dpi ink jet printhead or a 600×600 dpi effective resolution using a 300 dpi ink jet printhead. This resulting image would therefore appear to be printed with a higher resolution.

U.S. Pat. No. 5,270,728 to Lund et al., the disclosure of which is incorporated herein by reference, discloses a method of multiplying the speed resolution of a raster scanning device such as an ink jet printer. A 300×600 dpi pixel image is mapped to a corresponding, nonoverlapping physical dot image and the ink jets are fired in response to the dot image to direct ink droplets onto the printer at a 600 dpi resolution grid timing to effectively double the horizontal resolution of the pixel image.

U.S. Pat. No. 5,270,728 describes thinning the pixel image before it is printed by selectively turning OFF pixels within the pixel image by referencing the edges of the pixel image. More specifically, U.S. Pat. No. 5,270,728 describes a method of maintaining selected ones of the pixels in an ON state based on ON pixel adjacency and edge proximity criteria. In U.S. Pat. No. 5,270,728, the pixel image that is initially received is a 300×600 dpi image. The described method thins the pixel image so as to print at the resolution of the printhead.

However, it may also be desirable to increase the resolution of a 300×300 dpi pixel image to have the visible appearance of a higher resolution. Particularly, it may be desirable to print the pixel image at a 300×600 dpi effective resolution or even better yet at a 600×600 dpi effective resolution. This results in enhancing the curves on edges of the image.

U.S. Pat. No. 5,029,108 to Lung, the disclosure of which is incorporated herein by reference, teaches a method of enhancing edge representations when an image is converted from graphical format to print format. Edges are modified by repositioning related dots or by altering the dot size. A TBAP (To Be Adjusted Pixel) located on an edge is modified to enhance the smoothness of a segment transition. Gradient mask matrices are used to determine whether a change of brightness occurs.

U.S. Pat. No. 4,437,122 to Walsh et al., the disclosure of which is incorporated herein by reference, teaches a method of enhancing the resolution and quality of characters. A pixel pattern is formed including a center pixel and neighboring pixels.

The pixel pattern is compared with standard pixel patterns and the center pixel may be altered based on the standard pixel pattern that the current pixel pattern matches.

U.S. Pat. No. 5,742,300 to Klassen, the disclosure of which is incorporated herein by reference, discloses a method of printing an image having a 300×600 dpi effective resolution with an ink jet printer that has a 300 dpi resolution. The method increases a resolution or density of the pixel image along the raster scan axis. The pixel image is thinned and raster scanned with the ink jet printer to visibly reproduce the pixel image at the 300×600 dpi resolution. The pixel image may be thinned based on a checkerboard pattern while maintaining and enhancing edges.

U.S. Pat. No. 5,677,714 to Klassen et al. the disclosure of which is incorporated herein by reference, discloses a method of printing an image having a 600 dpi resolution along a horizontal axis with an ink jet printer that has a 300 dpi resolution. The disclosed method maintains the edges of the pixel image and uses a checkerboard pattern for all interior pixels other than the second pixel and the second last pixel at each pixel row. Thus, the method is neighbor insensitive by using a checkerboard pattern or mask to determine the state of the interior pixels. After turning OFF the respective pixels, ink drops are fired from the ink jet printer at areas corresponding to the remaining ON pixels to visibly reproduce the image at the 600 dpi resolution along the horizontal axis.

Other prior art resolution enhancement methods may print excessive amounts of ink on the copy sheet which causes the ink to run and distort the image. Furthermore, the ink jet should have the ability to generate drops at such a high frequency when a grid timing of the pixel is altered.

SUMMARY OF THE INVENTION

This invention may provide a method of two-dimensional resolution enhancement and thinning preferably by altering a 300×300 dpi image to produce a 600×600 bitmap image and then thinning the bitmap image using priority masks prior to printing on an image receiving medium. Other resolutions such as 400 and 800 dpi are also within scope of this invention.

The invention may provide a method for printing a pixel image using a ink jet printer having a first resolution along a first axis and a second resolution along a second axis transverse to the first axis. The method may include receiving the pixel image having the first resolution along the first axis and the second resolution along the second axis. The method may then increase the resolution of the pixel image along the first axis and the second axis. The method may then alter edges of the pixel image and thin the pixel image using priority masks. Then, the method may raster scan the thinned pixel image with the ink jet printer to visibly reproduce the pixel image at the increased resolution.

This summary of the invention is in no way meant to limit the scope of the present invention but rather is a brief summary of at least one aspect of the invention. Other objects, advantages and salient features of the invention will become apparent from the detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

Figure 1:
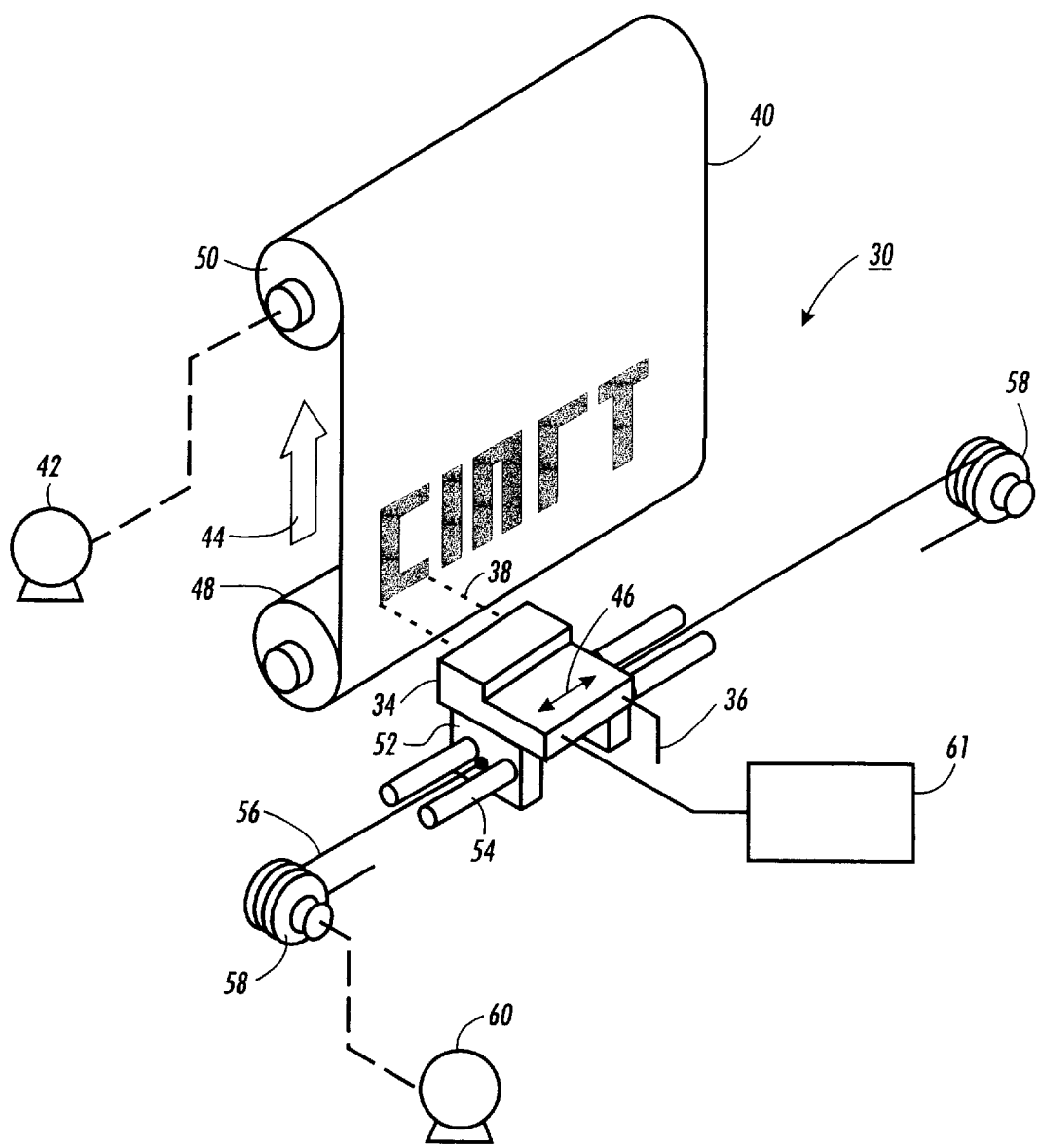
FIG. 1 is a schematic view of an ink jet printing system.

FIG. 1 shows a carriage-type ink jet printing device 30. A linear array of droplet-producing channels is housed in the printhead 34 of a reciprocating carriage assembly 36. Ink droplets 38 are propelled to a receiving medium 40 that is stepped by a motor 42 a preselected distance in the direction of arrow 44 each time the printhead 34 traverses across the receiving medium 40 in the direction indicted by arrows 46. The receiving medium 40, such as paper, can be stored on a supply roll 48 and stacked onto a takeup roll 50 by the motor 42 or other means well known in the art.

The printhead 34 is fixedly mounted on a support base 52, which is adapted for reciprocal movement using any well known means such as the two parallel guide rails 54. The reciprocal movement of the printhead 34 may be achieved by a cable 56 and a pair of rotatable pulleys 58, one of which is powered by a reversible motor 60. The printhead 34 is generally moved across the receiving medium 40 perpendicular to the direction the receiving medium is moved by the motor 42. Of course, other structures and methods of reciprocating the carriage assembly 36 are also known within the art.

The printhead 34 may be connected to a controller 61 that will be used with embodiments of the present invention to receive a pixel image and perform two-dimensional resolution enhancement and thinning on the pixel image prior to or simultaneously with printing the pixel image. The controller 61 may include hardware or software to carry out the present invention. Further, it is understood that the above description of the ink jet printing device 30 is merely illustrative and is not limiting. That is, other structures are also within the scope of this invention.

The present invention will be described with respect to receiving a 300×300 dpi pixel image, altering the pixel image to a 600×600 dpi bitmap image and then thinning the pixel image prior to raster scanning the image. The printhead 34 is preferably adapted to print ink drops at a 300 dpi resolution. Therefore, the method described below preferably gives the appearance that a 300 dpi printhead is printing at a 600×600 dpi effective resolution. However, the resolutions discussed herein are merely illustrative and are not intended to be limiting. That is, other resolutions are also within the scope of this invention.

The present application applies an algorithm to: (1) smooth nearly vertical edges; (2) smooth nearly horizontal edges; and (3) remove approximately three-quarters of the pixels in the interior (i.e., thin the interior) preferably using priority masks. These phases may be combined into a more complex but faster algorithm. Some optimizations may be applied to make the two-dimensional enhancement fast enough to keep up with high quality mode printing; although more optimizations can be applied. The greatest increase in speed comes from recognizing white space early and applying minimal processing where it occurs.

Figure 2:
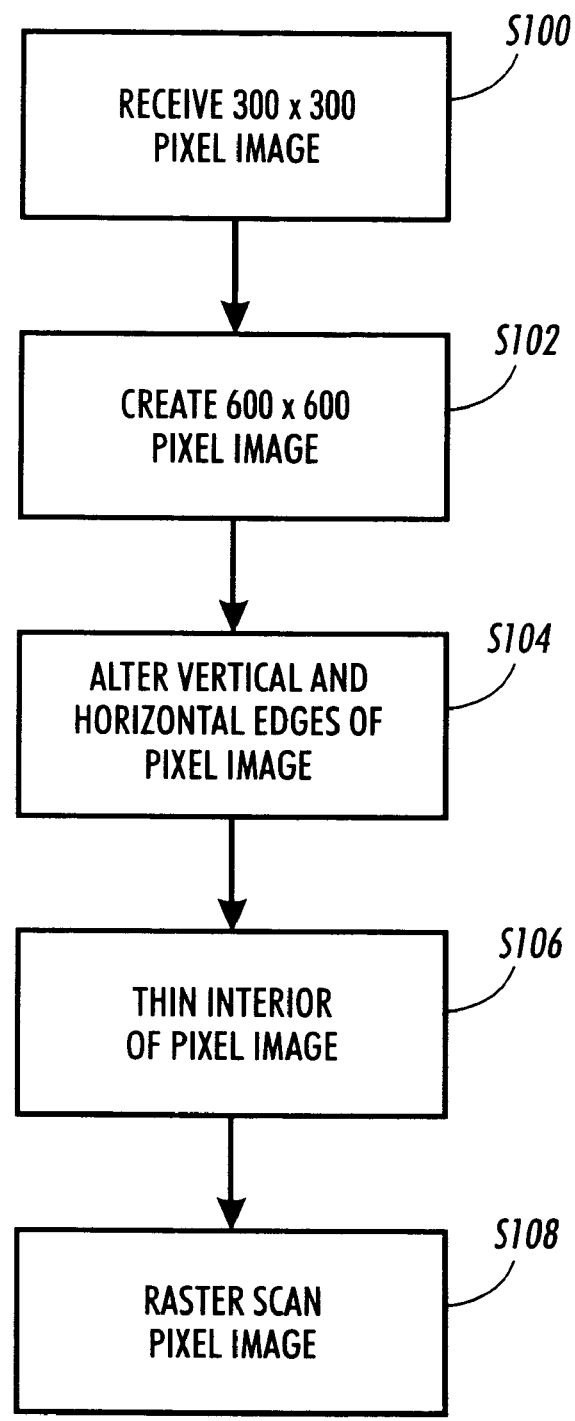
FIG. 2 is a flowchart showing a method of the present invention.

FIG. 2 is a flowchart describing the present invention. In step S100, a 300×300 dpi pixel image is received within the controller 61. The image may be created from a scanning device, a ROS, a computer or other similar device. In step S102, a 600×600 dpi pixel image (i.e., bitmap image) is created from the 300×300 dpi pixel image. This increases the number of pixels within the pixel image. Thus, step S102 effectively doubles the resolution along a horizontal axis and doubles the resolution along a vertical axis, which is transverse to the horizontal axis. Step S102 is not limited to doubling the resolution along either axis but rather any increase of the resolution or density within both the horizontal and vertical axis may be used. In step S104, edge regions of the pixel image are enhanced to improve the visual quality of the edge regions and to take advantage of the visual qualities of the increased resolutions along both the horizontal and vertical axis. One effect of edge enhancement is to smooth the edges to avoid jagged edges or staircase edges that occur when using lower resolution.

In step S106, interior regions of the pixel images are thinned preferably using priority masks so as to avoid too much ink being printed on the image receiving member. Although steps S102, S104 and S106 are described as separate steps, these steps may be combined and performed simultaneously and/or separately. Such a modification is within the scope of this invention.

In step S108, the printhead 34 is scanned across the image receiving medium 40 to discharge 300 dpi ink droplets based on the pixel image that has undergone the two-dimensional resolution enhancement and thinning. In addition to the visually enhanced edge regions, interior regions of the pixel image are also visually enhanced because the thinning step S106 avoids excess ink from being deposited on the image receiving member 40.

The following discussion uses the terminology vertical edges and horizontal edges which are well known terms to one of ordinary skill in the art. For example, a vertical edge of an image is one that you notice when you scan an image from left to right (i.e., it extends from the top of the page to the bottom). A horizontal edge of an image extends in a left to right manner and is noticed if one scans an image from the top to the bottom.

Vertical Edge Enhancement

Figure 3:
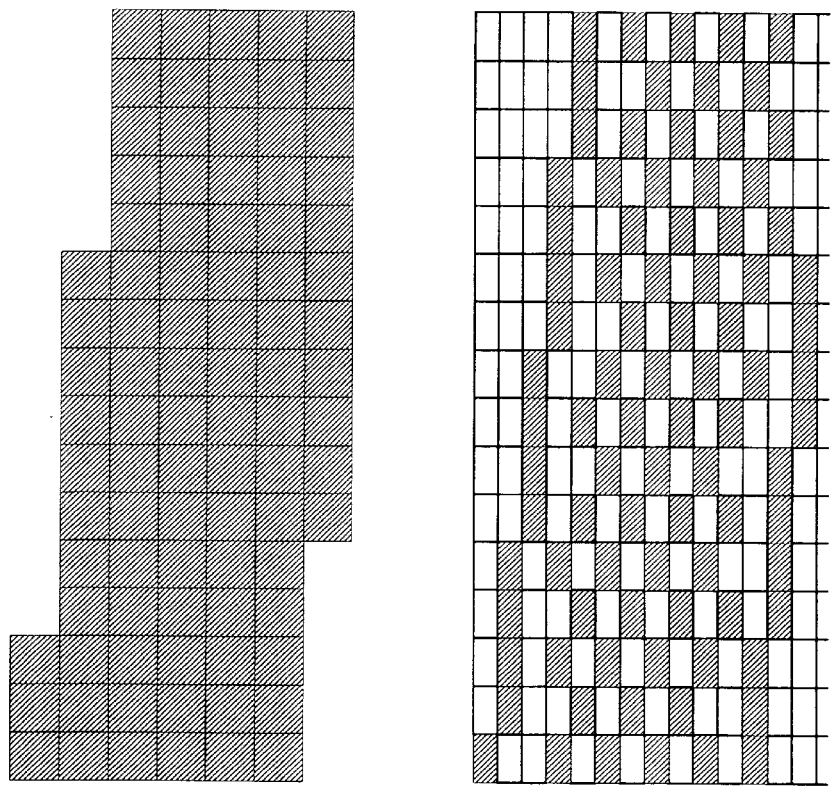
FIG. 3 is an example of resolution enhancement.

Vertical edge enhancement may be performed by the method described in U.S. Pat. No. 5,742,300 to Klassen. For example, a 300×300 dpi image may be converted into a 300×600 dpi pixel image and the vertical edges may be smoothed to simulate a 600 dpi image. FIG. 3 shows an example of resolution enhancement along the raster scan axis as described in U.S. Pat. No. 5,742,300.

Figure 4:
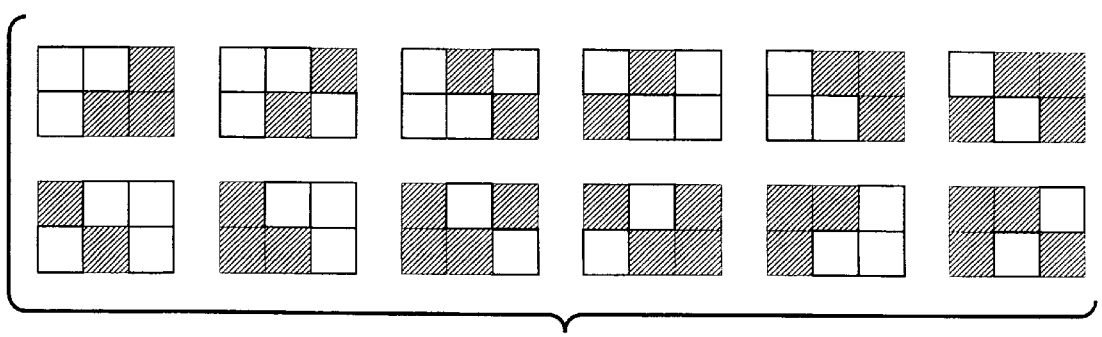
FIG. 4 shows one example of patterns used to smooth vertical edges.

More specifically, a three pixel wide window may be used to smooth edges. If the contents of the window differ from one scanline to next, then a jog and an edge are determined to have occurred. If the current window matches a left or right translation of one of the previous windows, then the current pixel is considered to be at an edge and the jog is smoothed. Pixels outside the three pixel wide window are ignored when comparing the current pixel's window to the window for the previous scanline. FIG. 4 shows examples of a three-pixel wide window for a current scanline and a previous scanline in which a jog occurs. In each of the twelve patterns shown in FIG. 4, the lower line indicates the current three pixel wide window while the upper line indicates a previous scanline of three pixels. Patterns that indicate a jog undergo special transition processing. A pattern indicates a jog if the lower (current) line matches a right or left shift of the upper (previous) line when the middle pixel is changed, as is the case for each of the patterns shown.

In accordance with U.S. Pat. No. 5,742,300, when a transition appears in the input pixel image, the algorithm may scan backward and forward as many as sixteen lines seeking the previous and next changes in the pattern for the current three pixel wide window. If n identical scans are found in the backward direction, n/4 smoothing pixels may be introduced before the transition. If m identical scans are found in the forward direction, then (m+2)/4 pixels may be introduced after the transition. Thus, on average, if k identical scans separate jogs, then (2k+2)/4=(k+1)/2 smoothing pixels are introduced which results in alternating patterns of $\lfloor k/2 \rfloor$ and $\lfloor (k+1)/2 \rfloor$ pixels along an edge of slope k/2. If k is even, then the two expressions are the same. If k is odd, then the average is k/2.

To reduce memory and time required to convert resolutions, the present invention may use four auxiliary buffers: a previous transition buffer, a pattern count buffer and two previous pattern buffers. The previous transition buffer may indicate whether the last transition was moving left or right. One bit per pixel suffices, although bytes may be accessed faster provided sufficient memory is available. The pattern count buffer may indicate the number of previous scanlines for which the pattern did not change. When a transition is detected, the pattern count buffer may be reset to zero. The first previous pattern buffer may contain a three bit value for each pixel indicating the pattern for the window centered on that pixel at the previous scanline. The second previous pattern buffer may contain the three bit value for each pixel at the last scanline where a transition occurred. Alternatively, a single bit per pixel may be used to indicate whether the last transition was one indicating smoothing.

As a scanline is processed, each pixel and its two neighbors may be used to compute the three bit pattern. This pattern may be compared with the one in the previous pattern buffer, and if they match, the value in the pattern count buffer may be incremented. It is preferable to keep a scanline of current patterns in addition to the scanline of previous patterns. The scanline of current patterns may be rapidly computed by a lookup table with indexed bytes, along with a few operations to correct byte boundaries.

Smoothing pixels that follow a jog are preferably introduced as soon as possible as additional scanlines are read. Pixels that precede a jog are preferably introduced immediately when a new jog is encountered.

Smoothing pixels that follow a jog are preferably introduced every time enough new scans (with the same pattern) have been read to warrant another smoothing pixel (to a preferred limit of four smoothing pixels). If the pattern count reaches 1 (indicating two consecutive identical patterns), then one smoothing pixel may be introduced at the previous transition. If the pattern count reaches 5, then another smoothing pixel may be introduced one scanline later. This is repeated at counts of 9 and 13. When the pattern count is 1, a smoothing pixel may be introduced at the previous scanline where the pattern count was 0. When the count is 5, a smoothing pixel may be introduced at the scanline where the pattern count was 1. When the count is 13, the smoothing pixel may be introduced at the scanline where the count was 3, which is ten scans prior to the current scanline. In this fashion only ten scanlines must be retained for possible smoothing pixels.

Another method of introducing smoothing pixels after a jog is to wait until the next jog, or sixteen scanlines have been seen, and then introduce all of the smoothing pixels for the preceding jog. This method may be simpler, but requires retaining fully sixteen scanlines.

One method introduces smoothing pixels before a jog by introducing up to four smoothing pixels in the last four scanlines (working back from the current scanline), using as many pixels as a quarter of the pattern count (rounded up). For this operation, only four scans prior to the current scanline are required. These four are the most recent four of the ten already required for introducing pixels after a jog. Altogether, ten scans of the output may be buffered, and one scan of the input may be buffered in addition to the pattern count and previous pattern buffers.

This technique may be faster if bytes or words are tested as being zero (white) before any of the processing is performed. For example, if two scanlines in a row are zero, then no processing other than doubling is required. Thus, the second scanline will produce exactly the same output as the first scanline. Even if the previous scanline is not zero, then if the current byte or word is zero, the pattern need not be extracted nor compared with that in the previous pattern buffer for any of the eight or more pixels in the current byte or word. The pattern extraction and comparison may be a bottleneck for those bytes in which it is required. A scanline of states indicating which bytes/words of the previous line were white will allow faster processing; yet, the previous pattern is cleared on the first white line. It need not be cleared on the second and later white lines. There also may be pending smoothing operations when a blank line is encountered. These operations are performed for the first blank byte/word/line.

Horizontal Edge Enhancement

Horizontal edge enhancement is well known to one skilled in the art. Horizontal edges may be easier to process than vertical edges because the current scanline (two output scanlines) contains all of the pixels affected by a transition. A single variable may indicate the number of identical windows of the current pattern, and another variable may indicate the previous pattern.

One primary delay is extracting the pattern (which involves extracting a bit from each of three bytes or words in the current scanline and those above and below).

However, skipping past white (zero) bytes improves performance dramatically (where they occur in all three scanlines). If the vertical processing precedes the horizontal processing, it can pass along white space information, thereby saving the horizontal processing and the cost of testing each byte. If the current scanline is blank, it can be skipped entirely and no thinning will occur.

The thinning step or THINNING algorithm generally occurs after edge enhancement although thinning could occur simultaneous with or prior to the enhancement. For thinning at 600 dpi uniform addressability, one in four pixels is preferably left ON.

In one method of interior thinning, no two individually adjacent pixels should be ON. Standard Floyd-Steinberg error diffusion at levels under 50% may be used. *An Adaptive Algorithm For Spatial Greyscale*, by Robert W. Floyd and Louis Steinberg, Proceedings of the Society for Information Display, pp. 75–77, the disclosure of which is incorporated herein by reference, discloses such a technique which is well known to one skilled in the art. Error diffusion has some inherent edge enhancement, which improves the quality of edges. Therefore, a simple approach to interior thinning is to treat the binary image as having two values: 0 and M (the maximum coverage level) and error diffuse the image down to one bit. An 8 bit representation for M is more than sufficient. Optimizations in the error diffusion are possible when it is known that there are only two input values. The advantage of error diffusion is that any desired coverage level may be obtained in this manner. A disadvantage of error diffusion, addressed in an alternative embodiment, below, is that there is no control over exactly which pattern of pixels is printed.

Figure 5:
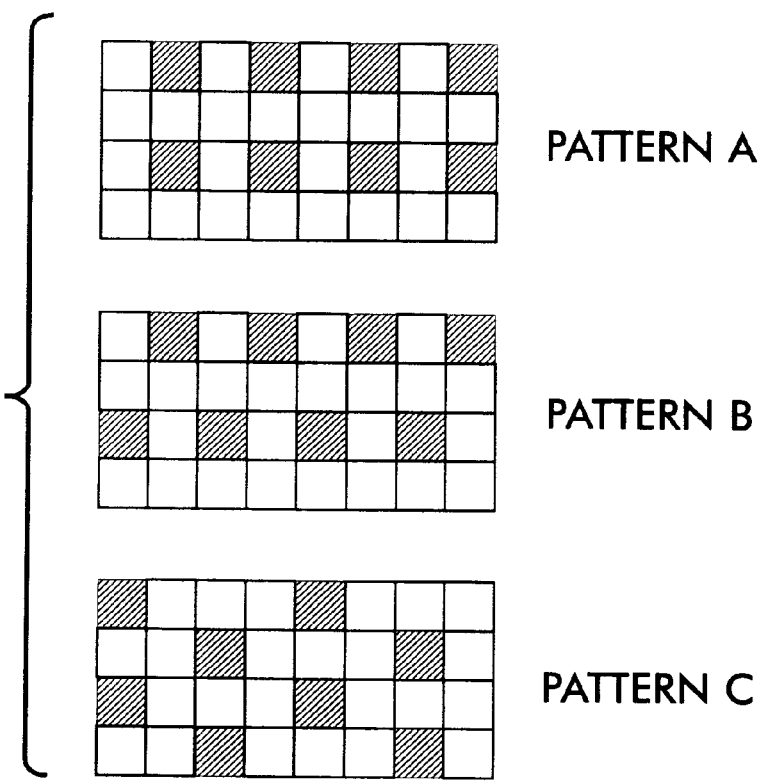
FIG. 5 shows three patterns of printing during thinning.

Printing may occur in two passes, (the head has jets spaced at 300 dpi), with a step of a half head width+/−half a 300 dpi scanline between passes. In order to exercise all of the jets as uniformly as possible on both passes, while providing a uniform appearance, pixels should preferably follow pattern C of FIG. 5. Pattern C provides the most uniformity as compared with patterns A and B, which do not exercise all jets on one pass, except while printing edges. Unused jets increase the need for priming while increasing the visibility of misdirected or missing jets.

Pattern C has black pixels in bits 1 and 4 for odd-numbered scanlines, or bits 3 and 7 for even-numbered scanlines of each byte. An implementation of this pattern reduces the horizontal resolution to 300 dpi which may defeat the point of edge adjustment. A simple process generates the desired pattern while leaving the edges intact at 600 dpi addressability.

One way of generating the pattern is to logically AND the pixel bitmap with a pattern of 88 HEX on even scanlines and 22 HEX on odd scanlines. This is fast and effective for regions that are entirely black. Another algorithm may be used close to edges based on simple masks (hereafter a mask-based approach). A mask-based approach may be effective in interiors as well as at edges and thus can be used everywhere.

Another embodiment of the present invention used to thin the pixel image utilizes a priority-mask-based approach in which each 2×2 block of the 600×600 pixel image is processed in a left-to-right pass. Using a 2×2 mask of preferred pixels (i.e., a priority mask), each pixel in the mask is tested to see whether a black pixel lies in that location. The pixels within the mask are prioritized so that if more than one black pixel lies within the mask, the most preferred pixel is used while the other pixels are turned OFF.

Figure 6:
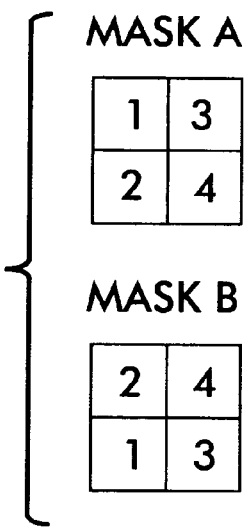
FIG. 6 shows two priority masks used in a priority-based mask approach to thinning for a priority-based-mask approach in accordance with the present invention.
Figure 7A:
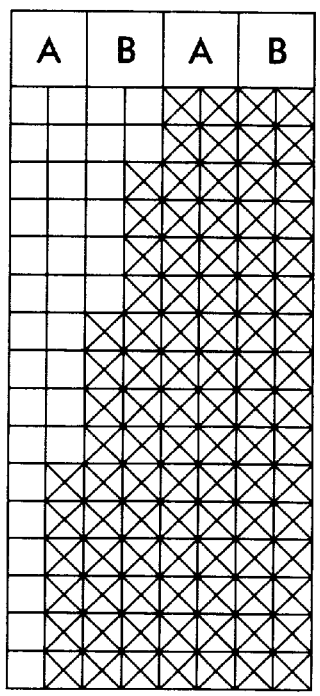
FIGS. 7A–7B show the image prior to and after thinning for a priority-based-mask approach.
Figure 7B:
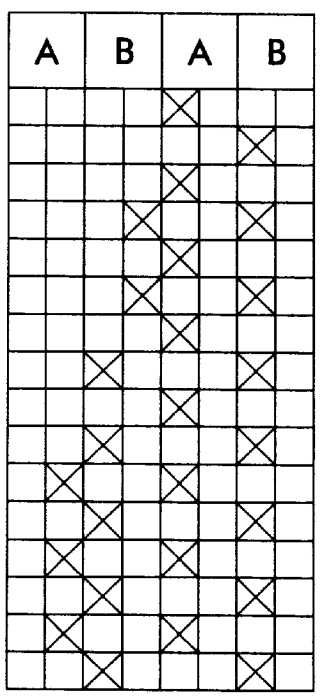

Two priority-based masks are shown in FIG. 6. First mask A is used, then mask B is used and so on in an alternating manner. Mask A and mask B both show the prioritization of the four pixels of the respective mask (numbered 1–4). The highest priority pixel is numbered one, the next priority pixel is numbered two, the third priority pixel is numbered three and the lowest priority pixel is numbered four. Mask A has the highest priority pixel in the upper left-hand corner pixel and mask B has the highest priority pixel in the lower left-hand corner pixel. In this way, interior regions of the pixel image match the desired pattern. FIGS. 7A and 7B show the result of thinning an enhanced image. FIG. 7A shows the image prior to thinning and FIG. 7B shows the image following thinning using priority masks. Labels at the top indicate the base masks used for the columns of two by two blocks. In both figures, the boxes with an X are black pixels and the boxes without an X are white pixels. In most cases, a preferred pixel is selected for each of the masks A and B. Along the edges, non-preferred pixels appear and no adjacent black pixels result. Along the left edge, a lower priority pixel of the mask appears since the high priority pixel is not black in the image.

Figure 8A:
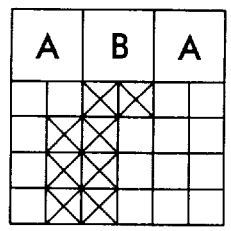
FIGS. 8A–8B show the image prior to and after mask suppression.
Figure 8B:
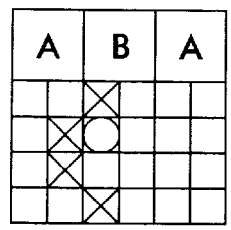

The present invention preferably does not include horizontally adjacent black pixels within the thinned image. For example, if a non-preferred pixel is used at the highest priority pixel, the base mask for the next pixel may be altered to prevent (horizontally) adjacent pixels. That is, if the rightmost pixel of either mask is used, the leftmost pixel in the same scanline is cleared in the other mask before it is used for the next 2×2 block. For example, if the image has only the two right-hand pixels set as a result of thinning, the top right pixel is used from mask A since it is a higher priority than the lower right pixel. On the next 2×2 block, mask B has its top left pixel forbidden to avoid horizontally adjacent pixels. For interior regions of wide objects, suppressing pixels in this way has no effect because the suppressed pixels are always lower priority. For narrow interior regions, lower priority pixels may be needed in the next block. FIG. 8A shows a thin stroke image and FIG. 8B shows the image after suppression. On the second row from the top, the only pixel in the first 2×2 block is the lowest priority pixel (i.e., priority #4). As a result, the highest priority pixel (priority #1) in mask B drops out of consideration (i.e., is suppressed) for the next block to its right. The pixel having the circle represents the suppressed pixel. Because that pixel is black in the input, it would normally have been selected for the output. Instead, the second highest priority pixel (priority #2) is used for mask B. For rows 3 and 4, the top left pixel in mask B is also suppressed due to mask A's priority pixel, but it would not have been chosen since the first priority pixel (priority #1) is black in the input for input mask B.

The simple mask approach gives proper results in the interiors of large black areas, and favors left edges, thereby preserving the quality of the left edge produced by resolution enhancement. For every two scanlines (corresponding to the nominal drop size), at least one drop is placed in an edge pixel.

Ideally, there should also be at least one pixel per two scanlines along right edges. The edge block may have one to four pixels occupied in the input. The more pixels there are in an edge block, the more complex the analysis becomes.

One to three pixels in an edge block may require little further consideration. If there is one pixel occupied, the edge is correctly reproduced by setting that pixel black. If there are two pixels occupied, they must be vertically or horizontally adjacent (a diagonal pair cannot result from resolution doubling). If they are side-by-side, there is only one scanline to consider. If they are one above the other, one of them will be set. Thus one and two pixel cases appear correct in the output with no special treatment. For the three pixel case, all three pixels are along the edge. Setting any one of the three available edge pixels results in having one pixel set per two scanlines.

Figure 9A:
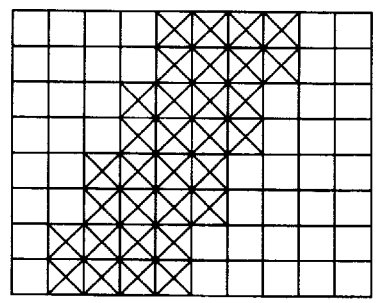
FIGS. 9A–9B show the image prior to and after right edge handling.
Figure 9B:
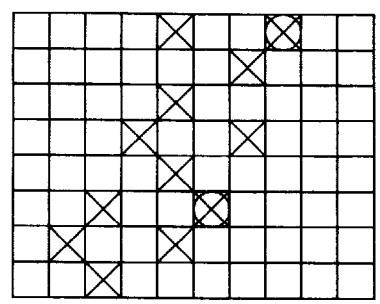

The four pixel case remains. In this case, absent any suppression due to a nearby left edge, the pixel set is in the left column. The edge can be detected on encountering the full block of white to its right. Then the pixel to the left of the one that would have been set had the block not been white is set. That is, when a full block of white is encountered, if the previous block was a full block of black, the pixel to set is selected as if the white block were black, and then the selected pixel is moved one to the left. FIG. 9A shows a pixel image prior to right edge handling. FIG. 9B show the thinned pixel image using the priority mask approach in which extra pixels added for right edge handling are shown with circles.

In summary, a method has been described for producing a high resolution image from a lower resolution image. The method consists of expanding the image in either the vertical or horizontal direction, and then expanding it in the other direction. Smoothing pixels are introduced as appropriate to give a high resolution appearance. After the image is expanded, the method continues by thinning the image. Thinning may be performed by error diffusion, but preferably edges are treated as special cases. Thinning may also be performed using constant masks in the interiors of regions of solid black, with special treatment of edges. Finally, thinning may be performed using the same algorithm throughout, using priority masks which work not only at edges but also in interiors.

While the invention has been described in relation to preferred embodiments, many modifications and variations are apparent from the description of the invention. All such modification and variations are intended to be within the scope of the present invention as defined in the appended claims.

What is claimed is:

1. A method for printing a pixel image using an ink jet printer having a first defined resolution along a first axis and a second defined resolution along a second axis transverse to the first axis, the method comprising the steps of:
   receiving the pixel image having the first defined resolution along the first axis and the second defined resolution along the second axis;
   increasing a resolution of the pixel image along the first axis and the second axis;
   thinning the pixel image using at least one priority mask, the priority mask corresponding to a plurality of pixels of different priority levels;
   raster scanning the thinned pixel image with the ink jet printer; and
   stepping a printhead of the ink jet printer between scanlines to visibly produce the thinned pixel image at the increased resolution.

2. The method of claim 1, wherein the first defined resolution is approximately 300 dots per inch along the first axis and the second defined resolution is approximately 300 dots per inch along the second axis.

3. The method of claim 1, wherein the increased resolution is approximately 600 dots per inch along the first axis and approximately 600 dots per inch along the second axis.

4. The method of claim 1, wherein the resolution increasing step comprises increasing a number of pixels in the pixel image.

5. The method of claim 1, further comprising altering vertical edges aligned with one of the first axis and second axis within the pixel image, and altering horizontal edges aligned with the other of the first axis and the second axis within the pixel image.

6. The method of claim 5, wherein the horizontal and vertical edges are altered prior to the thinning step.

7. The method of claim 5, wherein the altering step comprises adding pixels along an edge of the pixel image.

8. The method of claim 5, wherein the altering step comprises deleting pixels along an edge of the pixel image.

9. The method of claim 1, wherein the thinning step comprises the steps of examining a first block of pixels, comparing the first block of pixels with a first priority mask and thinning the first block of pixels based on the comparison.

10. The method of claim 9, wherein the thinning step further comprises the steps of examining a second block of pixels, comparing the second block of pixels with a second priority mask and thinning the second block of pixels based on the comparison.

11. A method for printing an image using a printer having a first resolution along a first axis and a second resolution along a second axis, the method comprising the steps of:
   increasing the resolution of the image along the first axis;
   increasing the resolution of the image along the second axis;
   thinning the pixel image using a priority mask corresponding to a plurality of pixels of different priorities; and
   printing the thinned pixel image with the printer by stepping a printhead between scanlines to visibly reproduce the thinned pixel image at the increased resolution along the first axis greater than the first resolution and at the increased resolution along the second axis greater than the second resolution.

12. The method of claim 11, wherein the first resolution is approximately 300 dots per inch along the first axis and the second resolution is approximately 300 dots per inch along the second axis.

13. The method of claim 11, wherein the increased resolution is approximately 600 dots per inch along the first axis and approximately 600 dots per inch along the second axis.

14. The method of claim 11, wherein the thining step comprises the steps of examining a first block of pixels, comparing the first block of pixels with a first priority mask and thinning the first block of pixels based on the comparison.

15. The method of claim 14, wherein the thinning step further comprises the steps of examining a second block of pixels, comparing the second block of pixels with a second priority mask and thinning the second block of pixels based on the comparison.

16. A method for printing a pixel image using an ink jet printer having a first defined resolution along a first axis and a second defined resolution along a second axis, the method comprising the steps of:
   receiving the pixel image having the first defined resolution along the first axis and the second defined resolution along the second axis;
   increasing a resolution of the pixel image along the first axis and the second axis;
   thinning the pixel image having the increased resolution along the first axis and the second axis using a priority mask of pixels with each pixel having a different priority level;

raster scanning the thinned pixel image; and stepping a printhead of the ink jet printer between scanlines to visibly reproduce the thinned pixel image at the increased resolution along the first axis and the second axis.

17. The method of claim 16, further comprising the step of adding pixels along an edge of the pixel image prior to thinning the pixel image.

18. The method of claim 16, further comprising the step of deleting pixels along an edge of the pixel image prior to thinning the pixel image.

19. The method of claim 16, wherein the thinning step comprises comparing a first plurality of pixels of the pixel image with a first priority mask and deleting select pixels from the first plurality of pixels based on the prioritized values of the first priority mask.

20. The method of claim 19, wherein the thinning step further comprises comparing a second plurality of pixels of the pixel image with a second priority mask and deleting select pixels from the second plurality of pixels based on the prioritized values of the second priority mask.

21. The method of claim 16, wherein the thinning step comprises deleting pixels from one scanline extending along the first axis and deleting pixels from another scanline extending along the first axis such that there are no vertically adjacent ON pixels and no horizontally adjacent ON pixels.

* * * * *